United States Patent
Capes

[11] Patent Number: 5,561,480
[45] Date of Patent: Oct. 1, 1996

[54] KEYBOARD PRACTICE GLASSES

[76] Inventor: Nelson R. Capes, 3161 W. Owasso Blvd., Roseville, Minn. 55113

[21] Appl. No.: 326,025

[22] Filed: Oct. 19, 1994

[51] Int. Cl.[6] .................................................. G02C 7/16
[52] U.S. Cl. ........................... 351/45; 351/46; 351/47
[58] Field of Search ........................... 351/44, 45, 46, 351/47, 57, 163, 51, 52, 53; 273/190 A; 84/453, 467, 468

[56] References Cited

U.S. PATENT DOCUMENTS

| | | | |
|---|---|---|---|
| 194,345 | 8/1877 | Frankil | 351/57 |
| 1,206,132 | 11/1916 | Otte . | |
| 1,206,457 | 11/1916 | Mills | 351/57 |
| 1,510,850 | 10/1924 | Jacobs et al. | 351/45 |
| 1,637,406 | 8/1927 | Brumder | 351/45 |
| 2,065,458 | 12/1936 | Hines | 351/57 |
| 2,413,193 | 9/1944 | Robblee | 351/47 |
| 2,694,263 | 11/1954 | Francis et al. . | |
| 3,111,675 | 11/1963 | Mora . | |
| 3,268,228 | 8/1966 | Novack | 273/183 |
| 3,555,563 | 1/1971 | Grossman | 2/14 |
| 4,168,111 | 9/1979 | Baines | 351/44 |
| 4,470,673 | 9/1984 | Gilson et al. | 351/44 |
| 4,493,538 | 1/1985 | Tolliver | 351/57 |
| 4,542,964 | 9/1985 | Gilson et al. | 351/44 |
| 5,164,749 | 11/1992 | Shelton | 351/47 |
| 5,229,796 | 7/1993 | Nitta | 351/47 |
| 5,372,504 | 12/1994 | Buechler | 351/47 |

FOREIGN PATENT DOCUMENTS 0896551  of 1945  France ........................ 351/57

*Primary Examiner*—William L. Sikes
*Assistant Examiner*—James A. Dudek
*Attorney, Agent, or Firm*—Palmatier, Sjoquist, Helget & Voigt, P.A.

[57] ABSTRACT

Keyboard practice glasses to be worn over the eyes of a student who is learning to sight-read sheet music, which completely prevent the keyboard student from accidentally looking down at his hands on the keyboard while allowing the student full view of the sheet music. The glasses comprise paired lens portions each of which is divided substantially in half to produce a clear region for viewing the sheet music and an opaque or translucent region which prevents viewing of the hands on the keyboard.

21 Claims, 5 Drawing Sheets

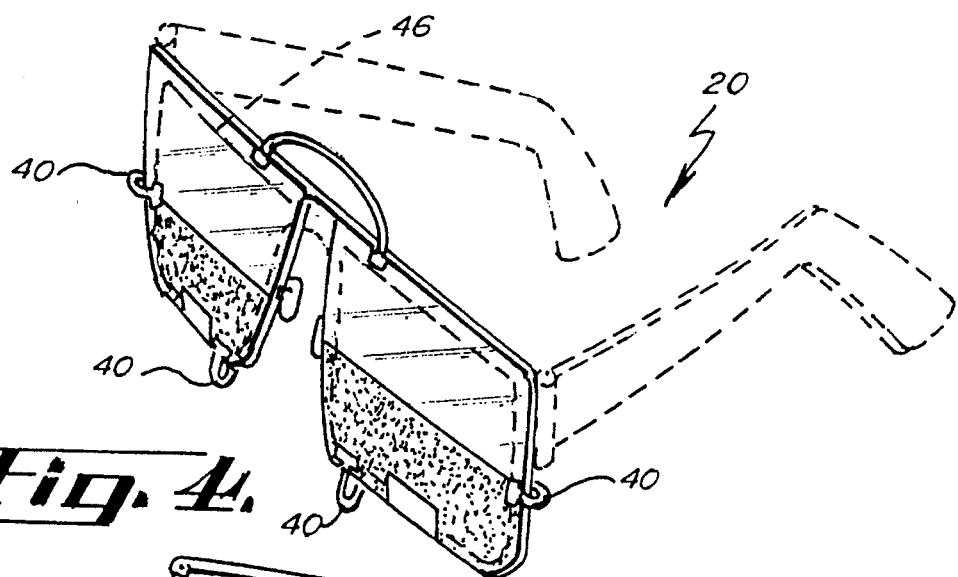
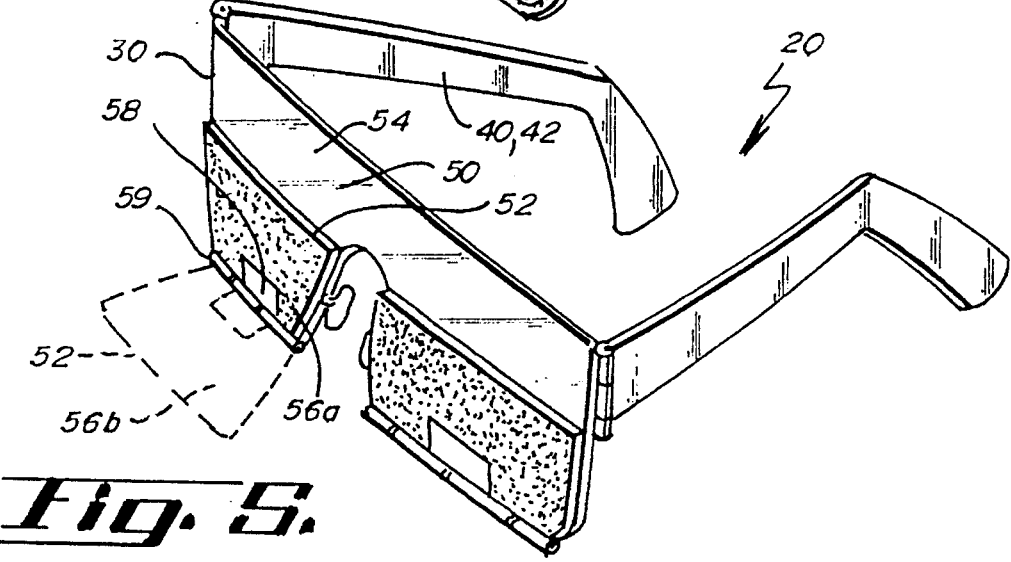
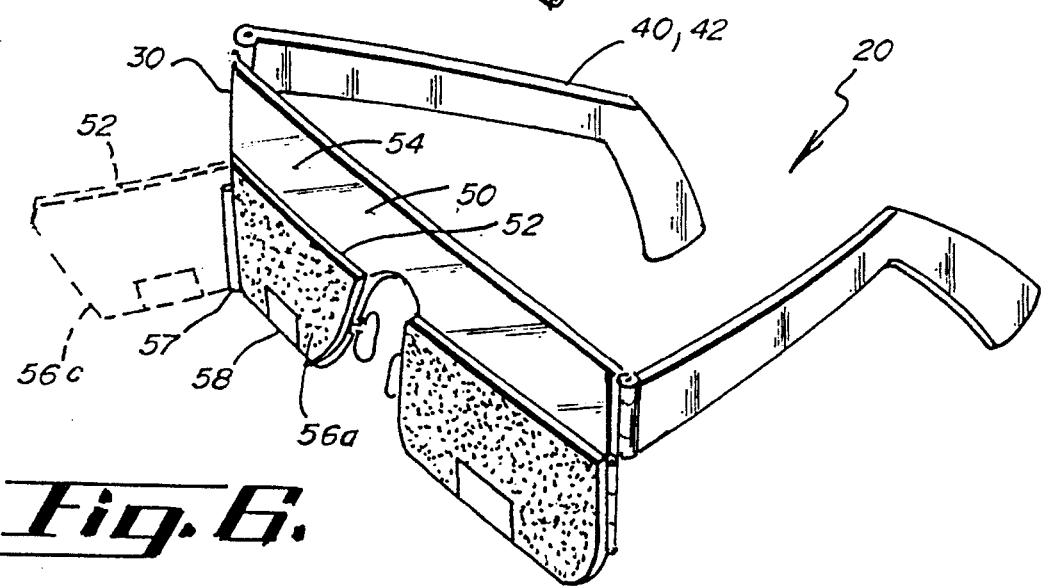

KEYBOARD PRACTICE GLASSES

The present invention relates to keyboard practice glasses which allow a musician to read sheet music on a music stand above a keyboard but prevent the musician from seeing the position of his hands on the keyboard.

In music instruction for keyboard (e.g, piano, organ, harpsichord, or synthesizer), it is highly desirable for the student to learn to sight-read music. That is, the student must learn to play the instrument by "feel", never taking his eyes off the sheet music. The student learns to translate the intervals between notes on the sheet music into certain physical intervals between the fingers of his hands, and to move the hands between positions also by feel. There is a great temptation or physiological reflex to look down at the hands, taking the eyes off the music momentarily. If the musician does this, he may easily lose his place in the sheet music and must pause to regain that place, making it difficult if not impossible to play accompaniments.

There is a need for a training apparatus which completely prevents the student from accidentally looking down at his hands. In the past, music teachers have tried to make such an apparatus from an apron which fits around the student's neck and shoulders and completely covers his hands on the keyboard. While such an arrangement does prevent the student from seeing his hands, it has a number of disadvantages. First, the teacher cannot see the student's hands, and thus cannot comment on his playing. Second, there are times when the musician must look down to move his hands, particularly when the hands must be moved over large intervals on the keyboard. An apron arrangement prevents the student from seeing his hands to make such large movements.

SUMMARY OF THE INVENTION

Keyboard practice glasses to be worn over the eyes of a student who is learning to sight-read sheet music, which completely prevent the keyboard student from accidentally looking down at his hands on the keyboard while allowing the student full view of the sheet music. The glasses comprise paired lens portions each of which is divided substantially in half to produce a clear region for viewing the sheet music and an opaque or translucent region which prevents viewing of the hands on the keyboard.

A principal object and advantage of the present invention is that it allows the music student an unobstructed view of the sheet music while completely blocking the student's view of his hands while his head is in a normal reading position.

Another object and advantage of the present invention is that it allows a music teacher to watch the student's hands while the student is playing the instrument even while the student cannot see his hands.

A feature of the present invention is that it provides keyboard training glasses with lens portions having an upper, optically clear zone through which the student may read the sheet music, and a lower, optically opaque or optically translucent zone which prevents the student from accidentally seeing his hands on the keyboard.

Another feature of the present invention is that the glasses may hook over the ears or may be clipped on to existing prescription glasses.

Another feature of the present invention is that it provides for a small, optically clear zone near the bottom of the opaque or translucent zone which allows the student to momentarily see his hands by tilting his head upward. This allows the student a view of his hands so that he may move them over large distances on the keyboard. However, the small size of this clear zone requires the student to make a positive head movement to see through it, preventing an accidental view of the hands.

Another feature of the present invention is that it provides for the height of the small, optically clear zone to be adjustable, to compensate for different distances of the student from the instrument and for students of different physical heights.

Another feature of the present invention is that it provides for the optically opaque or translucent zone to be movable away from the lens portion, so that the student may allow one of his eyes at a time to view the corresponding hand. For example, if the student is working on sight-reading the bass clef portion of the sheet music, he may move the optically opaque or translucent zone covering the right eye out of the way. This allows him to play the melody with the right hand using unobstructed vision while preventing him from seeing his left hand playing the bass part.

BRIEF DESCRIPTION OF THE DRAWINGS

FIG. 4 is a perspective view of the embodiment of FIG. 3, wherein the keyboard training glasses clip on to the wearer's existing glasses by means of peripheral hook clips.

FIG. 5 is a perspective view of a fourth embodiment of the present invention, including a hinge-mounted opaque area which may be moved downwardly to allow full viewing through one eye.

FIG. 6 is a perspective view of a fifth embodiment of the present invention, including a hinge-mounted opaque area which may be moved outwardly to allow full viewing through one eye.

DETAILED DESCRIPTION OF THE PREFERRED EMBODIMENTS

Figure 1:
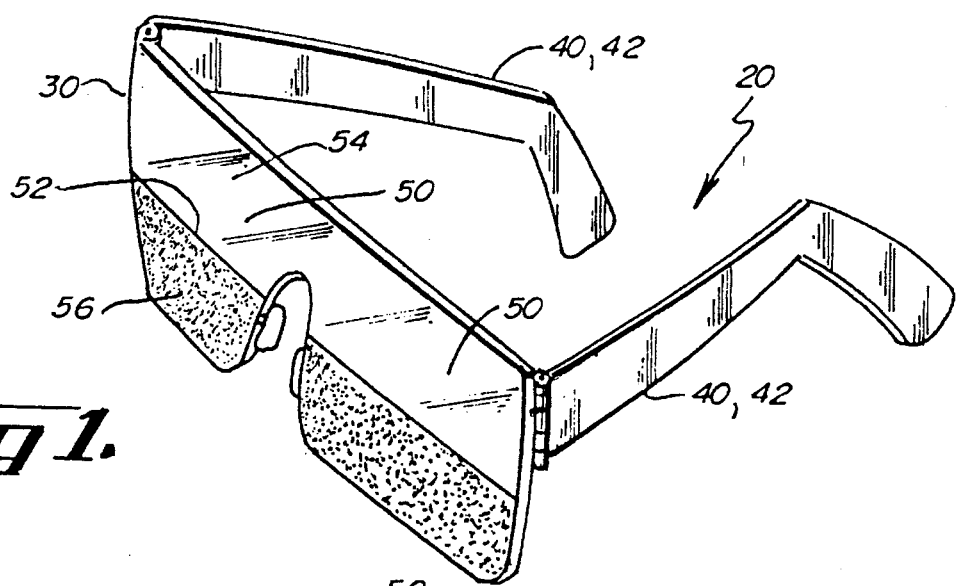
FIG. 1 is a perspective view of the keyboard training glasses of the present invention.

FIG. 1 shows a first embodiment of the present invention. The keyboard training glasses 20 comprise a frame portion 30 and a means 40 for securing the frame portion upon the head of the wearer. In FIG. 1, the means for securing 40 further comprises paired temple pieces 42 which hook over the ears of the wearer.

Figure 14:
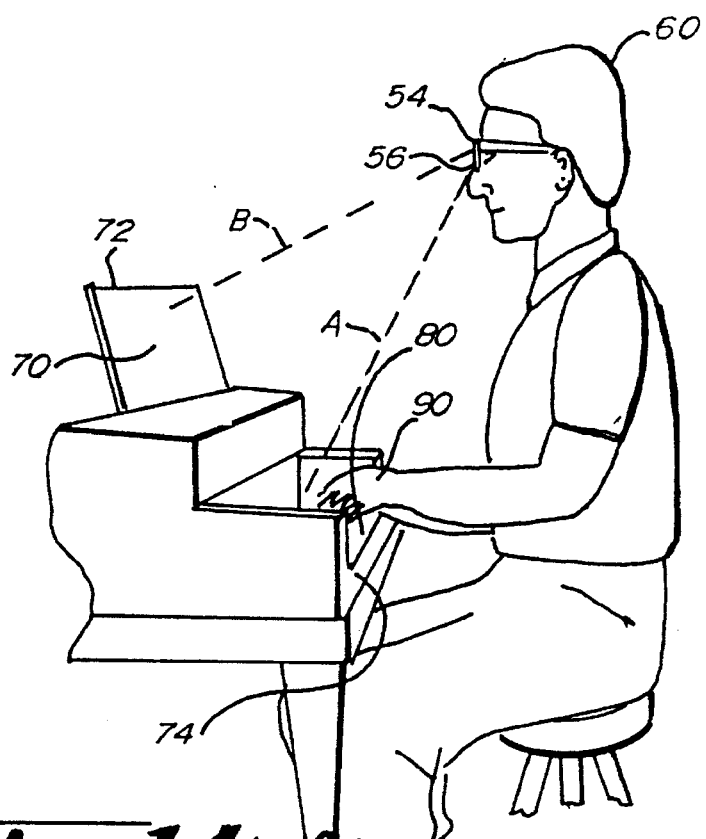
FIG. 14 is a perspective view of the wearer playing a keyboard instrument, showing the sight lines which are allowed by and prevented by the keyboard training glasses.
Figure 15:
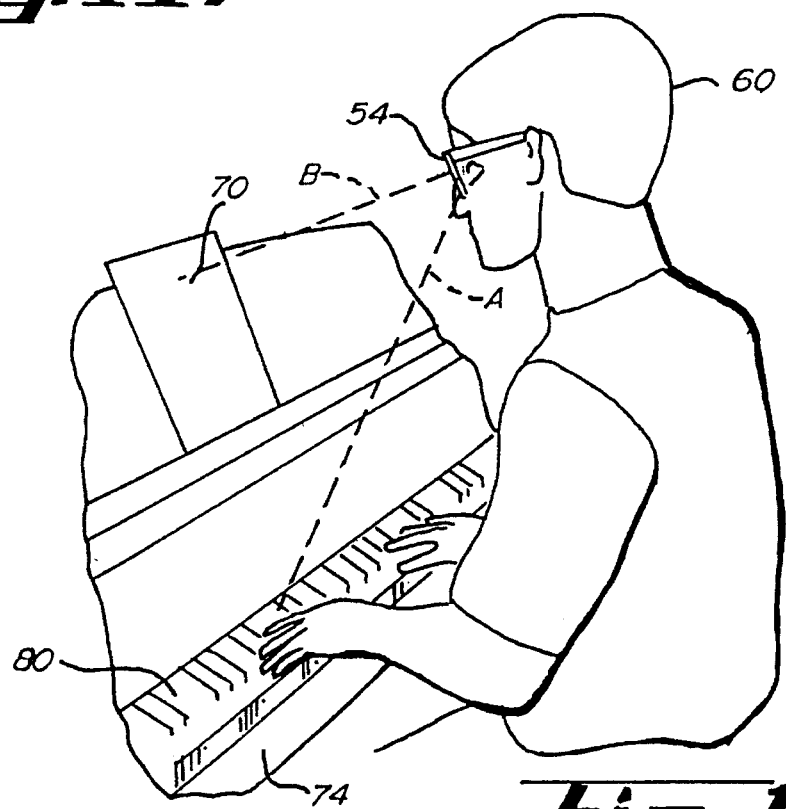
FIG. 15 is a perspective view of the head of the wearer in relation to the keyboard instrument, showing the sight lines which are allowed by and prevented by the keyboard training glasses.

The frame portion 30 further comprises paired lens portions 50. Each lens portion 50 is divided substantially in half by a straight horizontal boundary 52. The boundary 52 defines a clear optical region 54 above the boundary, and a second optical region 56 below the boundary. As best seen in FIGS. 14 and 15, the second optical region 56 blocks all lines of sight A from the eyes of said person below the boundary 52, while allowing all lines of sight B above the boundary 52.

As seen in FIGS. 14 and 15, such specific blocking of lines of sight allows the wearer to read sheet music 70 on the music stand 72 of the keyboard instrument 74, while preventing the wearer from seeing the keyboard 80 of the keyboard instrument 74 or the placement of the wearer's hands 90 on the keyboard 80. This prevents the keyboard student wearing the glasses 20 from accidentally looking down at his hands, which assists in training the student to read the sheet music 70 and play the keyboard instrument 74 without looking down at his hands.

It will be seen that, although the student is prevented from looking down at his hands, an instructor may view the student's playing for instructional purposes.

The second optical region 56 may be opaque, or alternatively it may be translucent. If the second optical region 56 is translucent, the student will not have a feeling of "blindness" as he wears the glasses.

The length of the temple pieces 42 may be made long enough that the glasses 20 may be worn over the wearer's standard prescription glasses.

Figure 2:
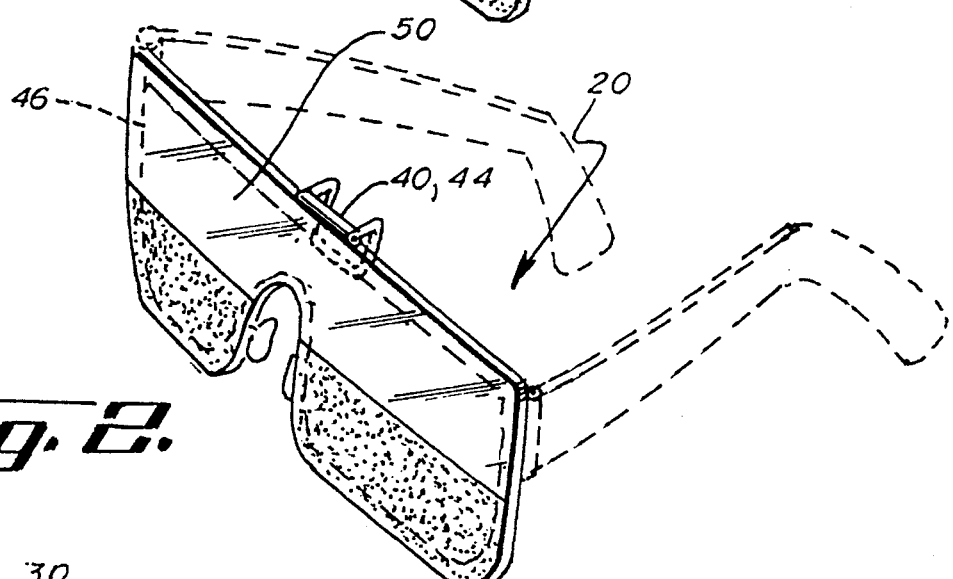
FIG. 2 is a perspective view of a second embodiment of the present invention, wherein the keyboard training glasses clip on to the wearer's existing glasses (shown in phantom) by a center-mounted spring clip.

Alternatively, FIG. 2 shows a second embodiment of the glasses 20 in which a center-mounted spring clip 44 is employed as the means for securing the frame portion 50 to the wearer's standard prescription glasses 46.

Figure 3:
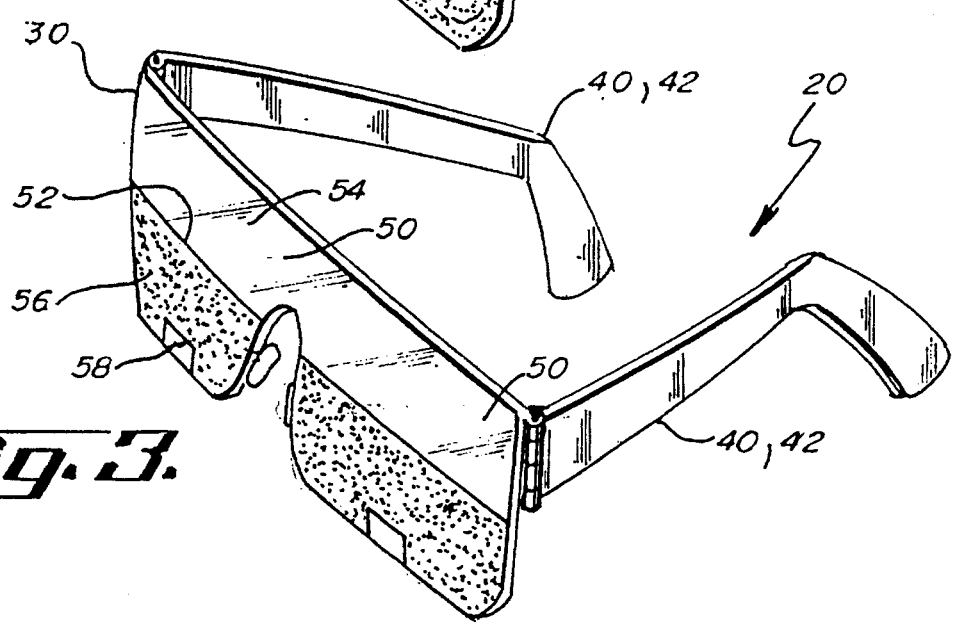
FIG. 3 is a perspective view of a third embodiment of the present invention, including a small non-opaque area for momentarily viewing the position of the hands.

FIGS. 3 and 4 show a third embodiment of the invention, further comprising a third clear optical region 58 within the second optical region, the third region 58 being centered on the lower edge of the second optical region 56. The height and width of the third clear optical region are less than the height and width of the second optical region, in order to prevent the wearer from viewing his hands through the third optical region. In the preferred embodiment, the third optical region has a width of one-fifth to one-third of the width of the second optical region 56 and a height of one-fifth to one-third of the height of the second optical region 56. The third optical region 58 allows the student to momentarily see his hands by tilting his head upwards. This allows the student to have a view of his hands in order to move them over large distances on the keyboard. However, the small size of the region 58 requires the student to make a positive head movement to see through it, thus preventing an accidental view of the hands.

FIG. 4 also shows that the glasses of any of the embodiments may be secured to the wearer's head by a means consisting of a plurality of hook-type clips which clip on to the periphery of the wearer's standard prescription eyeglasses 46.

FIG. 5 is a perspective view of a fourth embodiment of the present invention, including a hinge-mounted opaque area which may be moved downwardly to allow full viewing through one eye. As can be seen, the second optical region is alternatively positionable to cover the wearer's eye, as shown by reference numeral 56a, or moved downward to allow the wearer full view, as shown by reference numeral 56b, by means of the hinge 59. In this manner, the student may allow one of his eyes at a time to view the corresponding hand. For example, if the student is working on sight-reading the bass clef portion of the sheet music, he may move the optically opaque or translucent zone covering the right eye out of the way, as shown in FIG. 5. This allows him to play the melody with the right hand using unobstructed vision while preventing him from seeing his left hand playing the bass part.

FIG. 6 is a perspective view of a fifth embodiment of the present invention, wherein the hinge-mounted opaque area may be moved outwardly to allow full viewing through one eye. The second optical region is alternatively positionable to cover the wearer's eye, shown by reference numeral 56a, or moved outward to allow full view, as shown by reference numeral 56c.

Figure 7:
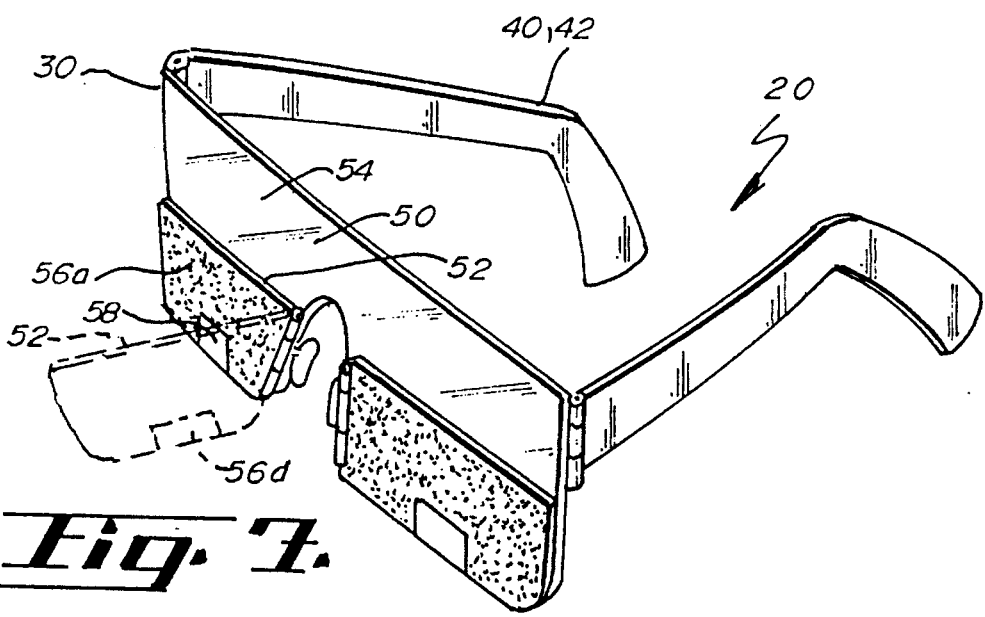
FIG. 7 is a perspective view of a sixth embodiment of the present invention, including a hinge-mounted opaque area which may be moved inwardly to allow full viewing through one eye.

FIG. 7 is a perspective view of a sixth embodiment of the present invention, wherein the hinge-mounted opaque area which may be moved inwardly to allow full viewing through one eye. The second optical region is alternatively positionable to cover the wearer's eye, shown by reference numeral 56a, or moved inwardly to allow full view, as shown by reference numeral 56d.

Figure 8:
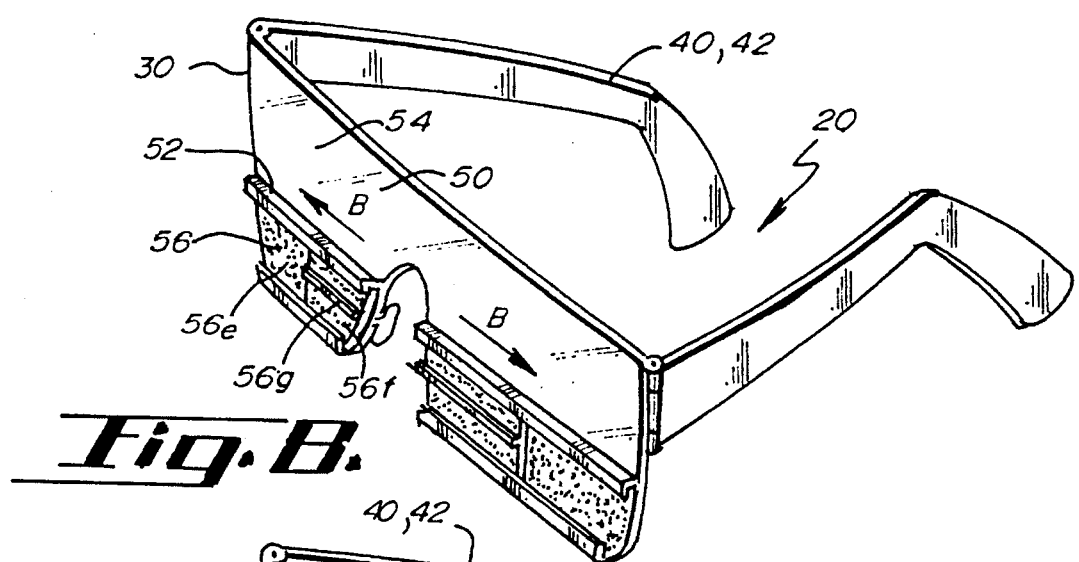
FIGS. 8 and 9 are perspective views of a seventh embodiment of the present invention, including a sliding opaque area which may be slid outwardly to allow full viewing through one eye.
Figure 9:
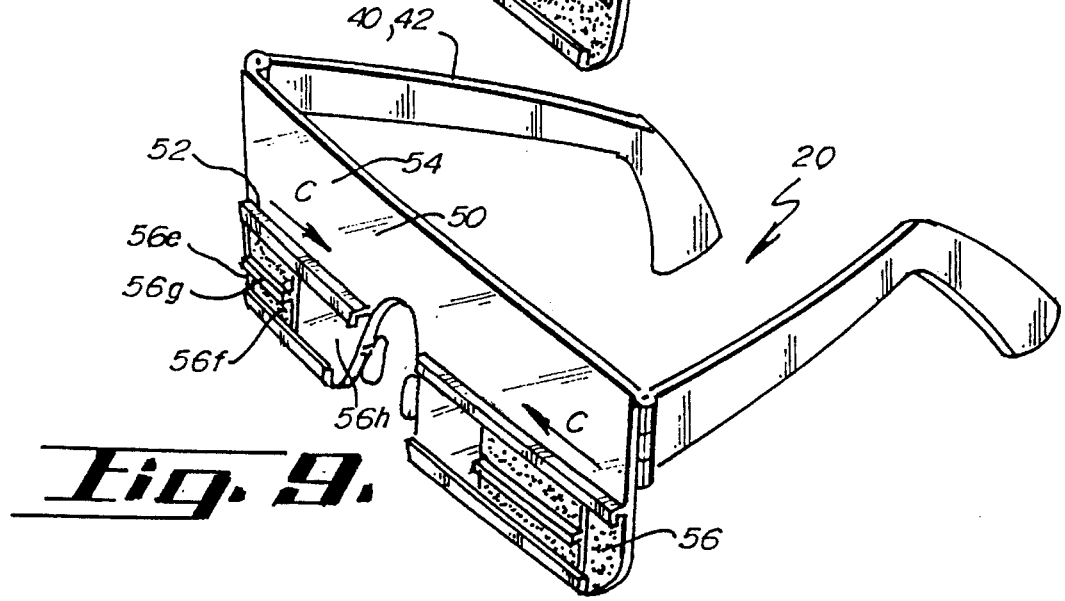

FIGS. 8 and 9 are perspective views of a seventh embodiment of the present invention, wherein the second optical region is slidably mounted so as to allow full view. As shown in the figures, the second optical region 56 further comprises a stationary portion 56e and a sliding portion 56f. In order to allow full view through one eye, the wearer grasps the sliding portion 56f by the handle 56g and slides the sliding portion 56f outwardly over the stationary portion in the direction shown by the arrow B. This opens a clear portion 56h, which may either be a clear part of the lens portion 50 or may be simply an aperture. To block off view from one eye, the wearer grasps the handle 56g and slides the sliding portion 56g inwardly in the direction shown by the arrow C.

Figure 10:
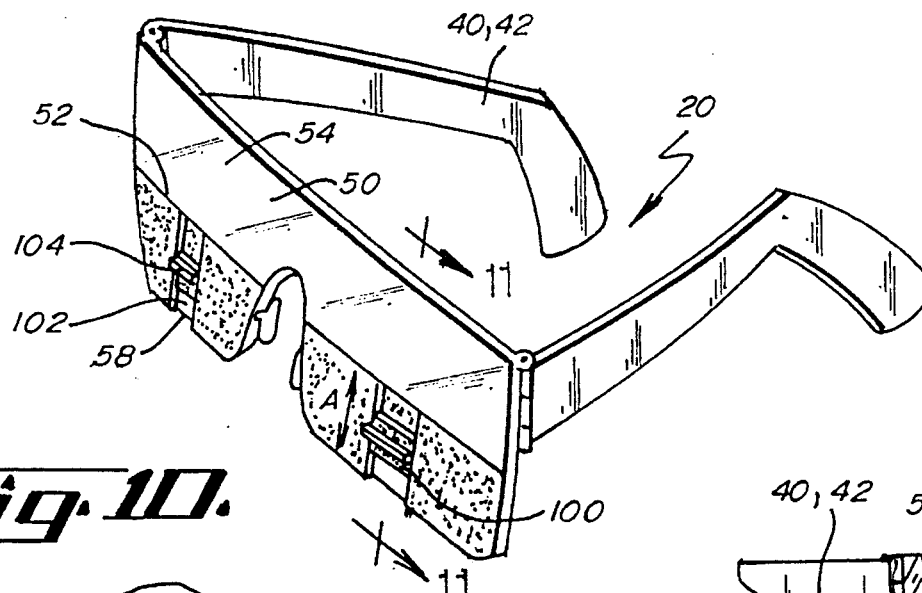
FIG. 10 is a perspective view of an eighth embodiment of the present invention, wherein the height of the small non-opaque area is adjustable.
Figure 11:
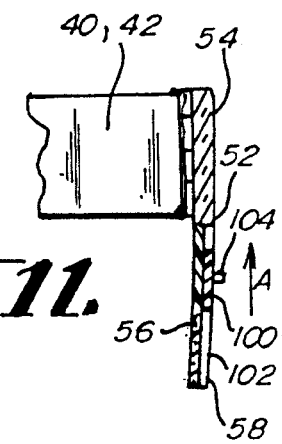
FIG. 11 is a cross-sectional view along the lines 11—11 of FIG. 10.
Figure 12:
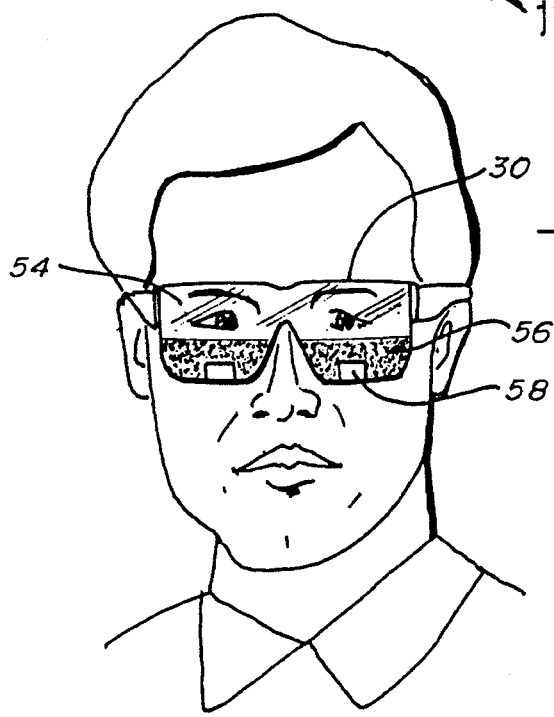
FIG. 12 is a front elevational view of the head of a wearer, showing positioning of the keyboard training glasses on the face.
Figure 13:
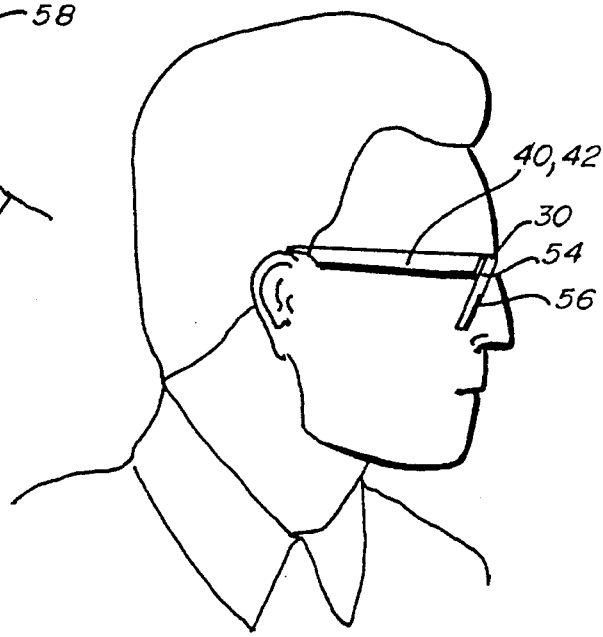
FIG. 13 is a side elevational view of the head of a wearer, showing positioning of the keyboard training glassses on the face.

FIG. 10 is a perspective view of an eighth embodiment of the present invention, wherein the third clear optical region 58 is adjustable in height. A sliding shutter 100 is mounted in a slot 102 within the second optical region 56. To increase the height of the third clear optical region 58, the wearer grasps the shutter handle 104 and slides the shudder upwardly as indicated by the arrow A, the shutter riding over the second optical region 56, as indicated in FIG. 11. To decrease the height of the third clear optical region 58, the user slides the shutter 100 downwardly. The region 58 may be completely closed by the shutter 100. In this manner, the height of the region 58 may be adjusted to compensate for varying distances of the student from the instrument or for varying physical height of the student. Without such an adjustment, either the hands 90 might be too easily visible, or too much movement of the head might be required to view the hands.

It will be recognized that any of the embodiments may be implemented as full glasses, as shown in FIG. 1, or as clip-on type glasses as shown in FIGS. 2 and 4.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Keyboard practice glasses for the eyes of a person in learning to sight-read sheet music on a music stand positioned above a keyboard, comprising:

a frame portion, and means for securing said frame portion upon the head of said person wherein said frame portion further comprises paired lens portions each lens portion being divided substantially in half by a straight horizontal boundary and having a clear optical region above said boundary and a second optical region below said boundary, said second optical region blocking all lines of sight from the eyes of said person below said boundary, thus preventing the person from seeing his hands on the keyboard while allowing the person to read the sheet music, further comprising a third clear optical region within said second optical region, wherein said third clear optical region is centered on the lower edge of said second optical region and wherein the height of said third clear optical region is less than the height of said second optical region and the width of said third clear optical region is less than the width of said second optical region, thus requiring said person to raise his head in order to see his hands on the keyboard.

2. The keyboard practice glasses of claim 1, wherein said means for securing the frame portion further comprises paired temple pieces which hook over the ears of said person.

3. The keyboard practice glasses of claim 2, wherein the length of said temple pieces allows said glasses to be worn over said person's prescription glasses.

4. The keyboard practice glasses of claim 1, wherein said means for securing the frame portion further comprises a center-mounted spring clip which clips on to the person's prescription glasses.

5. The keyboard practice glasses of claim 1, wherein said means for securing the frame portion further comprises a plurality of hook-type clips which clip onto the periphery of said person's eyeglasses.

6. The keyboard practice glasses of claim 1, wherein said second optical region is opaque.

7. The keyboard practice glasses of claim 1, wherein said second optical region is translucent.

8. The keyboard practice glasses of claim 1, wherein said third clear optical region has a height one-fifth to one-third of the height of said second optical region.

9. The keyboard practice glasses of claim 1, wherein said second optical region is movable away from said lens portion so as to allow full view of the keyboard through one eye.

10. The keyboard practice glasses of claim 9, wherein said second optical region is hinged to said lens portion.

11. The keyboard practice glasses of claim 10, wherein said second optical region is hinged to said lens portion along the lower edge of said lens portion, said second optical region thereby being movable downwardly.

12. The keyboard practice glasses of claim 10, wherein said second optical region is hinged to said lens portion along the outer edge of said lens portion, said second optical region thereby being movable outwardly.

13. The keyboard practice glasses of claim 10, wherein said second optical region is hinged to said lens portion along the inner edge of said lens portion, said second optical region thereby being movable inwardly.

14. The keyboard practice glasses of claim 1, wherein said second optical region further comprises a stationary portion and a sliding portion, said sliding portion slidably engaging said stationary portion so as to allow full view of the keyboard through one eye.

15. The keyboard practice glasses of claim 1, wherein the height of said third clear optical region is adjustable by the person.

16. The keyboard practice glasses of claim 15, further comprising a sliding shutter mounted within a slot in said second optical region.

17. Keyboard practice glasses for assisting a person to learn to sight-read sheet music on a music stand positioned above a keyboard, by blocking all lines of sight to the keyboard and the person's hands, comprising:

a frame portion, said frame portion further comprising paired lens portions, each said lens portion further being divided substantially in half by a straight horizontal boundary, each said lens portion having a clear optical region above said boundary and a second optical region below said boundary, said second optical region blocking all lines of sight from the eyes of said person below said boundary while said person's head is in a normal reading position, thus preventing the person from seeing his hands on the keyboard, and each said lens portion having a third clear optical region within said second optical region, said third clear optical region being centered on the lower edge of said second optical region and wherein the height of said third clear optical region is between one-fifth and one-third the height of said second optical region and the width of said third clear optical region is between one-fifth and one-third the width of said second optical region, thus allowing said person to see his hands on the keyboard by raising his head from a normal reading position, said frame portion being secured to the head of said person.

18. The keyboard practice glasses of claim 17, wherein said second optical region is movable away from said lens portion so as to allow said person to see the keyboard.

19. The keyboard practice glasses of claim 17, wherein the height of said third clear optical region is adjustable by the person.

20. Keyboard practice glasses for the eyes of a person in learning to sight-read sheet music on a music stand positioned above a keyboard, comprising:

a frame portion, and means for securing said frame portion upon the head of said person wherein said frame portion further comprises paired lens portions each lens portion being divided substantially in half by a straight horizontal boundary and having a clear optical region above said boundary and a second optical region below said boundary, said second optical region blocking all lines of sight from the eyes of said person below said boundary, thus preventing the person from seeing his hands on the keyboard while allowing the person to read the sheet music, further comprising a third clear optical region within said second optical region, wherein said third clear optical region is centered on the lower edge of said second optical region and wherein the height of said third clear optical region is less than the height of said second optical region and the width of said third clear optical region is less than the width of said second optical region, thus requiring said person to raise his head in order to see his hands on the keyboard.

21. The keyboard practice glasses of claim 20, wherein said third clear optical region has a height one-fifth to one-third of the height of said second optical region.

* * * * *